UNITED STATES PATENT OFFICE.

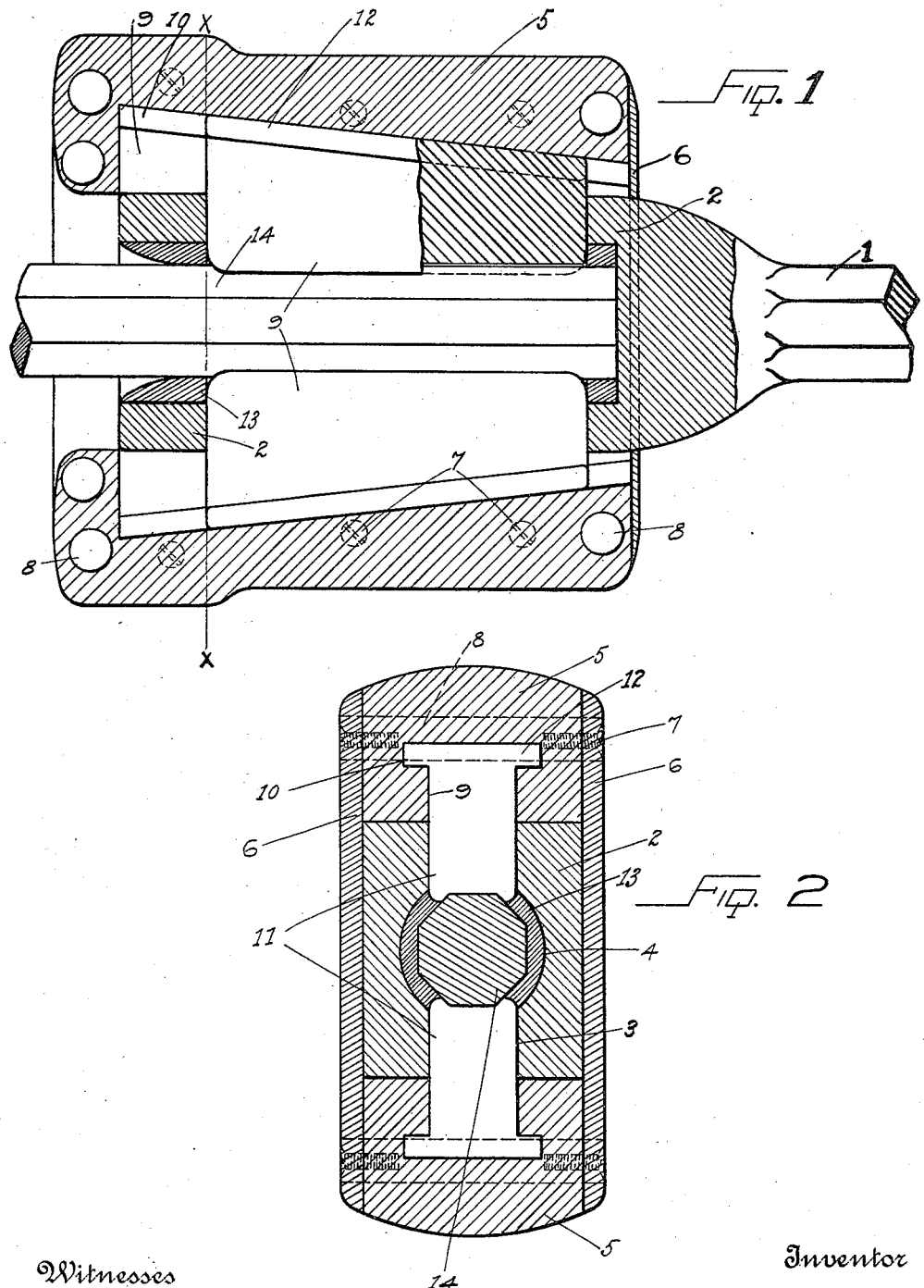

JOHN L. DABADIE, OF STOCKTON, CALIFORNIA, ASSIGNOR OF ONE-HALF TO COLUMBO BOITANO, OF STOCKTON, CALIFORNIA.

MINING-DRILL CHUCK.

1,044,029.   Specification of Letters Patent.   Patented Nov. 12, 1912.

Application filed January 23, 1912. Serial No. 672,927.

*To all whom it may concern:*

Be it known that I, JOHN L. DABADIE, a citizen of the United States, residing at Stockton, in the county of San Joaquin, State of California, have invented certain new and useful Improvements in a Mining-Drill Chuck; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in drills and particularly drills used for mining purposes, the object of the invention being to produce a drill chuck for drills which can be used for the hard work necessary for mining purposes, with particular respect to making the chuck so that the drill can be inserted in a rapid and effective manner without any possibility of the same binding or cramping.

A further object of the invention is to produce a chuck having but few parts and one in which the direct frictional contact means against the drill is in a straight alinement.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claim.

In the drawings similar characters of reference indicate corresponding parts in the several views.

Figure 1 is a sectional view of the complete drill chuck. Fig. 2 is a sectional view taken relatively on a line X—X of Fig. 1.

Referring now more particularly to the characters of reference on the drawings, 1 designates a machined stud having on its lower end a chuck 2. This stud 1 is in practice made to order to fit any drilling machine and hence my structure is an independent mechanism adapted to fit into the chuck of any machine and tightened therein by U-bolts or any adaptable structure. Said chuck 2 is provided in its sides with slots 3 and also with a central orifice 4 into which said slots 3 open.

The numeral 5 designates dogs disposed on each side of the chuck 2 and in a casing 6 to which they are screwed by bolts 7 and cross pins 8. In the inner edge of each of the dogs 5 are tapering slots 9 provided at their inner ends with T-slots 10. The said slots 9 normally register with the slots 3 in the chuck 2.

The numeral 11 designates keys or blocks having cross heads 12. These blocks 11 fit in the slots 3, which slots 3 are machined slots and of the same shape as said blocks 11 in order that said blocks 11 may fit snugly therein and have no motion longitudinally in said slots. The cross heads 12 of said blocks 11 fit into the T-slots 10. Said blocks 11 and 12 are tapered on their inner edges to conform to the tapered shape of the slots 9 and 10. The slots 9 and 10 are of a greater length than the length of the blocks 11 and 12 to permit the said dogs 5 to move up and down on said blocks 11 and 12 as will appear.

The numeral 13 designates a bushing disposed in the central orifice 4 of the chuck 2 through which bushing the keys or blocks 11 project to engage the sides of the drill 14, the face of said blocks 11 being shaped to correspond with the shape of the drill 14. This bushing 13 is of any suitable metal and is beveled at its forward end as shown in order to permit the easy insertion of the drill 14, and as will be seen said bushing is held in position by said blocks 11.

In practice the drill 14 is first inserted into the bushing 13 in the orifice 4 which bushing holds it sufficiently in position in the chuck 2 until the following operation takes place. The concussion of the first blow of the drill against the rock then drives the dogs 5 forward and causes them to slide over the parallel blocks 11 and 12. The tapered slots 9 and 10 and the taper of the blocks 11 and 12 cause said blocks 11 and 12 to firmly grip the drill 14. The slots 3 hold blocks 11 stationary while the dogs 5 tighten over them, as described.

When it is desired to release the drill 14 to change said drill or for any other purpose the blocks 5 are struck a blow at the front end thereof, which action drives the blocks 5 backward. This releases their frictional contact on the blocks 11 and 12 and hence leaves the drill free to be pulled out. The cross heads 12 pull the blocks 11 off of the drill so as to cause no drag.

As will further appear my improved chuck can be made as described to fit any drill now in use. Or this chuck mechanism can be formed on the piston of a drill as a component part thereof.

The metal of our improved mechanism is all composed of case hardened machine steel with the exception of the blocks 11 and 12 which are composed of tempered tool steel.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A device of the character described comprising the combination of a machined structure provided with a chuck on its lower end, such chuck being provided with slots in its sides, dogs spaced apart and provided with longitudinal T-shaped slots in their adjacent sides, said longitudinal slots being tapered longitudinally, tapered blocks projecting through said slots in said chuck, such blocks being of the same length as the slots in said chuck, cross-heads on said blocks fitting into said T-shaped slots, said T-shaped slots being of a greater length than the length of said blocks, and a drill in said chuck, as described.

In testimony whereof I affix my signature in presence of two witnesses.

JOHN L. DABADIE.

Witnesses:
STEPHEN N. BLEWETT,
FRANK H. CARTER.

Copies of this patent may be obtained for five cents each, by addressing the "Commissioner of Patents, Washington, D. C."